United States Patent [19]
Segbert et al.

[11] 4,199,289
[45] Apr. 22, 1980

[54] POSITIONING APPARATUS FOR ROLLER-TRANSPORT CART

[75] Inventors: Stephan Segbert, Bahnhofstrasse 47, Heek D-4431; Josef Segbert, Ahaus, both of Fed. Rep. of Germany

[73] Assignee: Stephan Segbert, Heek, Fed. Rep. of Germany

[21] Appl. No.: 930,190

[22] Filed: Aug. 2, 1978

[30] Foreign Application Priority Data

Aug. 3, 1977 [DE] Fed. Rep. of Germany ....... 2734878

[51] Int. Cl.² ............................................. B65G 67/02
[52] U.S. Cl. .................................... 414/347; 101/212; 104/167; 414/401
[58] Field of Search ............... 414/347, 396, 401, 584, 414/349, 911; 104/166, 167; 101/212

[56] References Cited
U.S. PATENT DOCUMENTS

| 1,774,338 | 8/1930 | Sos | 104/166 |
| 4,039,092 | 8/1977 | Schar | 414/401 X |

Primary Examiner—Robert G. Sheridan
Attorney, Agent, or Firm—Karl F. Ross

[57] ABSTRACT

A positioning system for a roller cart adjacent a transfer cart in a roller storage and retrieval system of a printing plant has a positioning screw at the pickup station where rollers are transferred between the pickup cart and the transfer cart. This positioning screw has a longitudinal axis extending parallel to the path followed by the pickup cart at the station and is formed with a pair of screw formations which are of opposite hand and which are axially spaced from each other with a gap between their inner confronting ends. An entrainment element on the cart is engageable with these screw formations and can fit between the inner ends thereof. The pickup cart then can be positioned in the station and the screw rotated to displace this cart so that the entrainment element is moved into the space between the ends, for exact positioning of the pickup cart at the station.

6 Claims, 3 Drawing Figures 4,199,289

POSITIONING APPARATUS FOR ROLLER-TRANSPORT CART

Field of the Invention

The present invention relates to a roller storage and transport system. More particularly this invention concerns an apparatus for positioning the transport wagon or dolly in such a system.

Background of the Invention

As described in our jointly filed and copending application Ser. No. 930,237, filed Aug. 2, 1978 it is standard practice to store the various rolls used in a large-scale printing operation on chain racks which each comprise a pair of generally parallel spaced-apart chains that are jointly displaceable past a transfer station. A plurality of pairs of holders are provided with one holder of each pair being carried on one of the chains and the other holder of each pair being carried on the other chain. Each holder pair defines a respective holder axis that is displaceable through the transfer station when the chains are moved. The transfer carriage or wagon is displaceable between this transfer station and a pickup station and serves to carry the rollers from the pickup station to the transfer station and vice versa. The transfer carriage has a cradle which is adopted to carry a roller and which is displaceable so that it can move the roller being carried into a position where the axis of this roller is aligned with the axis of the holder at the transfer station. When in this position it is possible for the holders of the chain rack to engage the ends of the roller. Similarly it is possible for the cradle to be lifted underneath a roller which is then released by the holders for transport of this roller away to the pickup station.

At the pickup station the transfer carriage or wagon passes the roller to or takes a roller from a transport wagon that moves through the printing plant on rails. The transport carriage or wagon is in turn provided with a cradle for holding the roller, but itself has little mechanism and is normally manually pushed from the pickup station to the press. The transfer carriage or wagon itself has the necessary mechanism for picking a roller up from the transport wagon or depositing one thereon.

It is therefore essential that the transport wagon or carriage be exactly positioned at the pickup station with respect to the transfer carriage or wagon, which normally moves perpendicular to the transport carriage. To this end stops or bumpers are provided at the pickup station which engage the transport wagon and are positioned to align this wagon in the exact position necessary. In fact it has been common experience that such stops or bumpers do not accurately position the transport wagon. Thus transfer of a roller between the transport and transfer wagons cannot in some cases take place, so that an operator must painstakingly reposition the transport wagon, and in times the bad positioning can lead to dropping of a roller with correspondingly expensive damage and down time. Even with exactly positioned stops, the tendency of the transport car to rebound frequently mispositions it. Also the alignment of the transport wagon with the stops, which must be carried out manually, is frequently not done with sufficient attention so that accidents can result.

Objects of the Invention

It is therefore an object of the present invention to provide an improved storage and retrieval system.

Another object is to provide such a system wherein proper positioning of the transport wagon is ensured.

Another object is to provide such a system combinable with the system of our above-cited copending patent application.

Summary of the Invention

These objects are attained according to the instant invention in a system wherein a positioning screw is provided at the pickup station. This screw has a longitudinal axis extending generally parallel to the path at the station and is provided with a pair of screw formations of opposite hand which are axially spaced from each other and have oppositely directed outer ends and confronting inner ends spaced apart by a predetermined distance. An entrainment element is provided on the transport wagon or carriage which is engageable with these screw formations and has a dimension measured parallel to the screw axis which is equal at most to the distance that is the spacing between the inner ends of the screw formation. The screw can be rotated about its axis in a rotational sense to displace the carriage when the element is engaging either of the formations into a position with the element between the inner ends of the screw formations and the carriage exactly aligned at the location with the transfer carriage.

Thus with the system according to the instant invention the cart need merely be roughly positioned in the pickup station. The positioning device is then actuated to rotate the screw through slightly less than one full revolution. If the wagon is to either side of the exact desired location its entrainment element will be engaged by the screw formations and the wagon will be displaced in the necessary direction to position it properly in the station.

According to this invention the screw is basically cylindrical and the formations are auger-type ribs provided on the surface of the screw and each extending over less than 360°. Furthermore the inner ends are provided with circumferential extensions having inner surfaces lying in respective planes perpendicular to the screw axis. Thus once the entrainment element has been moved into the central position by the screw formations it will be held thereby by the extensions at the inner ends of these screw formations during depositing of a roller on the pickup wagon or removal of a roller therefrom.

As mentioned above according to this invention the screw formations and their extensions extend over less than 360°. This leaves an axially extending gap along the screw which can be axially aligned with the entrainment element to allow same to pass axially the full length of the screw and past the screw. Once the transport wagon has picked up or dropped off the roller the screw is then advanced to align this space with the entrainment element for displacement of the transport wagon in either direction away from the pickup station. Limit switches cooperating with the screw can operate the drive therefor to place it in the necessary positions.

Specific Description

Figure 1:
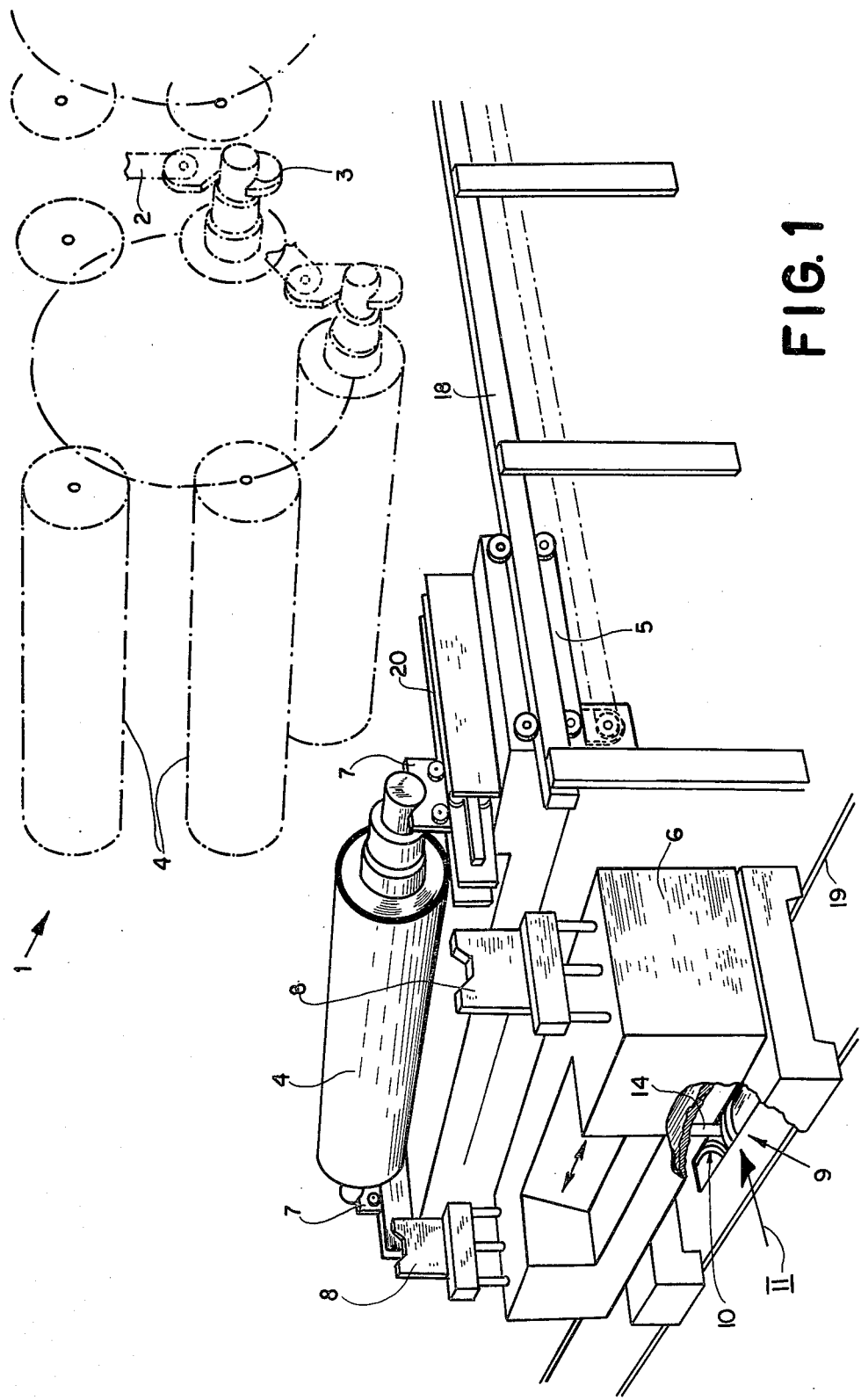
FIG. 1 is a perspective view of the system according to this invention.

As shown in FIG. 1 a pair of chain racks 1 each having chains 2 provided with holders 3 carries a plurality of rollers 4 much as described in the above-cited copending application whose entire disclosure is herewith incorporated. A pickup wagon 5 is displaceable along rails 18 under the chain racks 1 and serves to pass off a roller or pick up a roller from a transport wagon 6 displaceable along rails 19 in a direction perpendicular to the rails 18 at a pickup station 9.

The transfer wagon 5 has a cradle 7 displaceable horizontally on a telescoping rail arrangement 20 so that a roller 4 can be held over a vertically displaceable cradle 8 of the pickup wagon 6. To pick up a roller 4 from the wagon 6 the telescoping arrangement 20 is extended fully to position the cradle 7 under the cradle 8 which latter are then dropped down so that the roller 4 is deposited on the cradle 7. The opposite sequence of events is used for transfer of the roller 4 from the cradle 7 to the cradle 8. It is also possible to make the cradle 7 at least limitedly vertically displaceable instead of the cradle 8 for removing rollers from and placing rollers in the holders 3.

Figure 3:
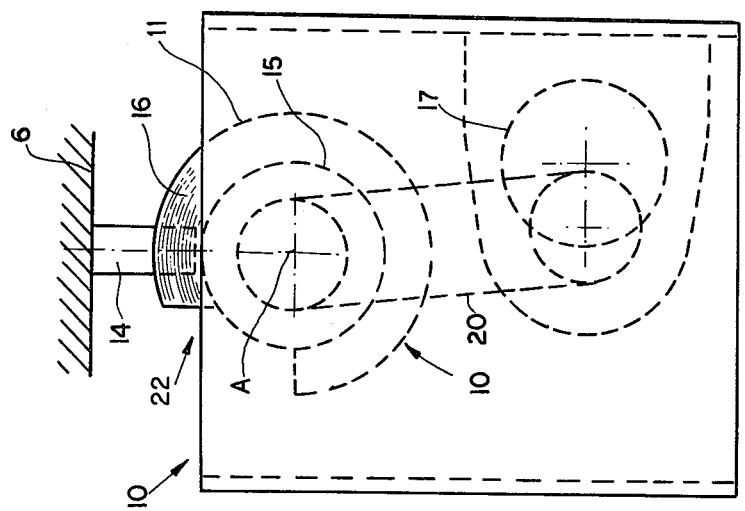
FIG. 3 is an end view of the structure shown in FIG. 2.
Figure 2:
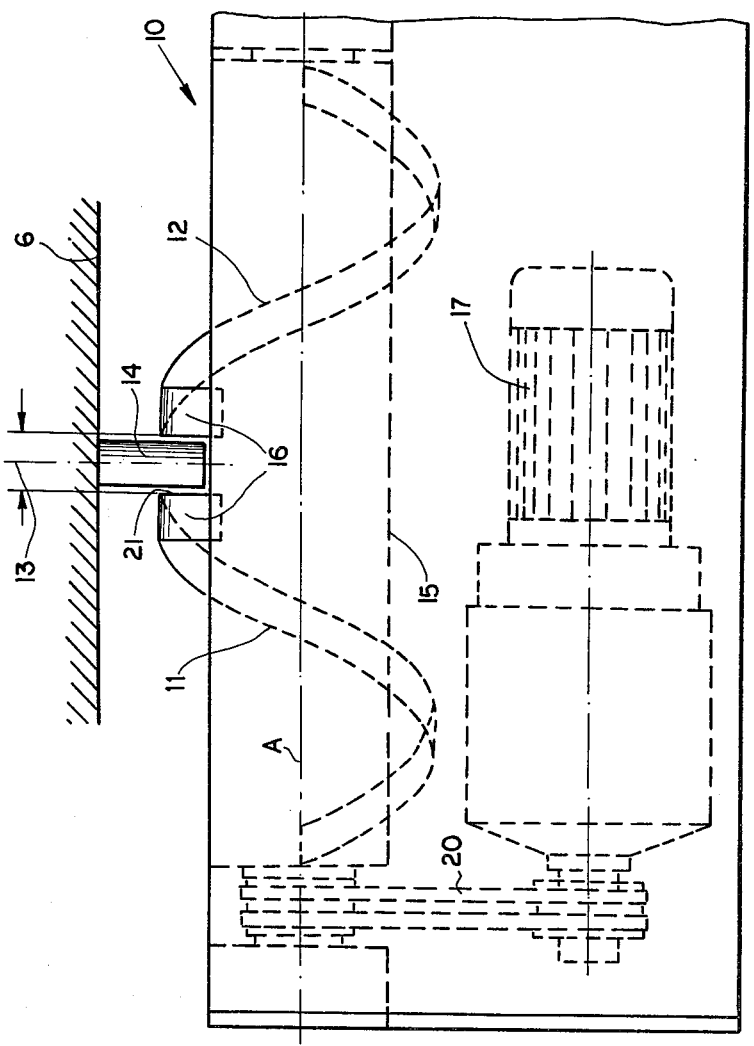
FIG. 2 is a large-scale view taken in the direction of arrow II of FIG. 1.

The carriage or wagon 6 is normally manually pushed along the rails 19 and has a positioning arrangement 10 at the pickup station 9. As shown in FIGS. 2 and 3 this positioning arrangement 10 basically comprises a cylindrical drum or screw 15 rotatable about a horizontal axis A parallel to the rails 19 and formed with a pair of screw formations or ribs 11 and 12 of opposite hand. The wagon 8 has a downwardly projecting entrainment pin 14 of a diameter measured in the direction of axis A which is slightly smaller than the spacing 13 between the inner ends of the screw formations 11 and 12. A gear motor 17 is connected via belts 20 to the screw 15. Each of the auger-type screw formations 11 and 12 has at its inner end a circumferential extension 16 having an inner surface 21 lying in a plane perpendicular to the axis A.

As best seen in FIG. 3 both the screw formations 11 and 12 and the extension 16 extend over less than 360° about the screw 15, leaving a gap or notch 22 that can be positioned underneath the pin 14 to allow passage of this pin 14 past the positioning arrangement 10 without engagement with any of the formations 11, 12, or 16.

In use the cart or wagon 6 is pushed generally into the station 9 when the screw 15 is positioned with the notch 22 upwardly. The motor 17 is then actuated to rotate the screw 15 through approximately 270° in such a direction that no matter where the pin 14 is positioned along the screw 15 one of the screw formations 11 or 12 will move it into the gap 13. Once properly positioned in the gap 13 the extension 16 will hold the pin 14 tightly in place with virtually no play to insure accurate transfer of a roller 4 between the cradles 7 and 8. Once the transfer is completed the motor 17 is again operated to rotate the screw 15 through another 45° to position the notch 22 upwardly so that the cart 6 can be pushed out of the station 9 in either direction along the track 19.

Thus with the system according to the instant invention the final exact positioning of the cart 6 is carried out in extremely simple manner by machinery which will always insure almost perfect positioning. So long as the cart 6 is at the station 9 and the pin 14 is engageable with either of the formations 11 or 12 such positioning is insured. The formations 11 and 12 have between their outer ends an overall length equal substantially to the length of the cart 6, so that even the sloppiest initial positioning of the cart 6 can be corrected.

We claim:

1. A system comprising:
    a carriage displaceable along a path into and out of a transfer station on said path;
    means for passing an object to be transported by said carriage thereto in an exact location at said station;
    a positioning screw at said station having a longitudinal axis extending generally parallel to said path at said station and formed with a pair of screw formations of opposite hand axially spaced from each other and having oppositely directed outer ends and confronting inner ends spaced apart by a predetermined distance;
    an entrainment element on said carriage engageable with said screw formations and having a dimension measured parallel to said axis equal to at most said distance; and
    means for rotating said screw about its said axis in a rotational sense to displace said carriage when said element is engaging either of said formations into a position with said element between said inner ends and said carriage exactly aligned at said location.

2. The system defined in claim 1 wherein said screw formations project radially from said screw and are each formed as a partial auger-type screw flight.

3. The system defined in claim 2 wherein said screw formations are formed at their inner ends with circumferential extensions each having an inner face turned toward the inner face of the other extension and lying in a respective plane substantially perpendicular to said axis.

4. The system defined in claim 3 wherein each of said extensions and each of said formations only extends over a portion of the circumference of said screw, said extensions and formations being axially aligned and leaving a clear axial path on said screw for displacement of said element along said screw without engaging said formations and extensions.

5. The system defined in claim 3 wherein said projection is a pin projecting from said carriage in a direction substantially perpendicular to said path at said station.

6. The system defined in claim 3 wherein said means for passing includes another carriage having a cradle adapted to a printing roller.

* * * * *